May 19, 1959
M. C. POOLE
2,886,863
REVOLVABLE WINDOWS FOR MOBILE HOME
Filed Sept. 21, 1955
2 Sheets-Sheet 1
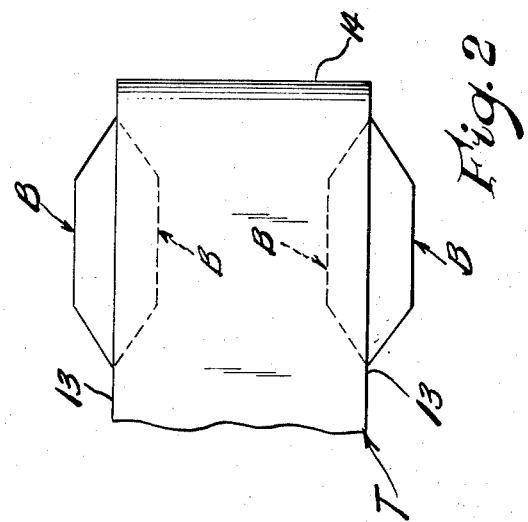
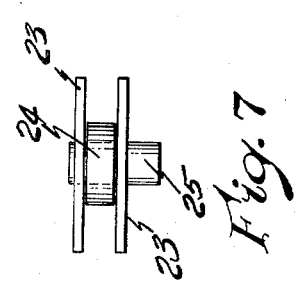
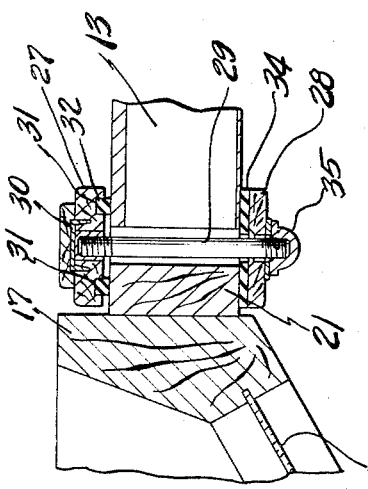
INVENTOR.
Myron C. Poole.
BY
Fearman & Fearman.
ATTORNEYS May 19, 1959 M. C. POOLE 2,886,863
REVOLVABLE WINDOWS FOR MOBILE HOME
Filed Sept. 21, 1955 2 Sheets-Sheet 2
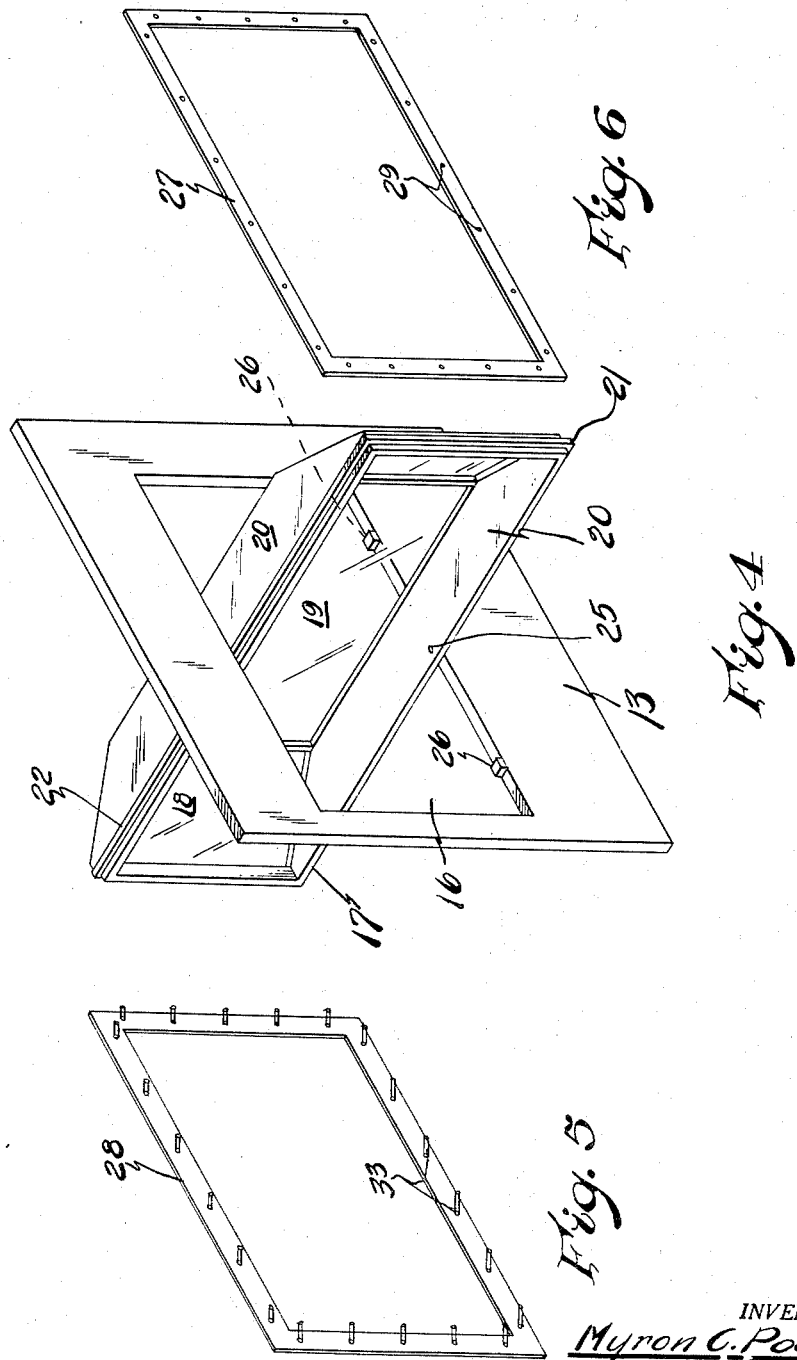
INVENTOR.
Myron C. Poole.
BY
Learman & Learman
ATTORNEYS

2,886,863

REVOLVABLE WINDOWS FOR MOBILE HOME

Myron C. Poole, Elwood, Ind., assignor to Revolvex Corporation, Alexandria, Ind., a corporation of Indiana Application September 21, 1955, Serial No. 535,680

5 Claims. (Cl. 20—53)

The present invention relates to mobile homes of the house or camp type intended to provide practical living and storage accommodations such as found in homes in general.

One of the salient objects of the invention is to design a mobile home which can be transported over the highways and provide means for enlarging the interior area so as to provide more commodious quarters when the home is located on its home site. Highway regulations at the present in force in the various states provide that any vehicle traveling over regular highway system shall not exceed eight feet in width, consequently the width of all mobile homes manufactured and hauled to the home site must conform to said regulation so that they can be moved from factory to the home site, or from one site to another.

Many homes have been designed expansible for the above purpose, but few have met with public acceptance, due to the fact that they are too loosely constructed to withstand road travel, and rapidly warp, sag and fall into misalignment after they have been used for a short period of time so that later expansion adjustment becomes a difficult and expensive problem, requiring excessive labor and skill to convert.

It is therefore, one of the prime objects of the present invention to provide a mobile home of conventional construction, provided with revolvable bay windows designed to fit in either conventional position, to extend beyond the side walls of the home, or in reverse position, so that the windows, in this reversed position, will project into the interior of the structure, thus permitting the home to be moved over the highways in strict observance of highway regulations as to width, etc.

Still a further object is to provide a revolvable bay window structure which can be easily and quickly reversed and secured, which provides additional area in the structure, as well as creating a more commodious, spacious appearance, enhancing the view of the persons occupying the home, and otherwise adding to the distinctive appearance of the structure.

A further object is to provide a reversible bay window which can be readily fitted into pre-formed openings in the walls of the mobile home, providing a neat appearing, weatherproof connection, making a very simple manufacturing operation, without the sacrifice of rigidity or stability.

With the above and further objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit or sacrificing any of the advantages of the invention.

In the drawings:

Fig. 1 is a side elevational view of a mobile home, showing my revolvable bay window in the position it will occupy when located on its home site.

Fig. 2 is a fragmentary diagrammatic plan view, the broken lines showing the windows reversed and projecting into the interior of the trailer, and the solid lines showing the windows in their normal, outwardly projecting position.

Fig. 3 is an enlarged fragmentary detail showing the connection of the window in the side wall of the home.

Fig. 4 is an enlarged perspective view showing the manner of revolving the window unit.

Fig. 5 is a perspective view of the inner frame.

Fig. 6 is a view similar to Fig. 5 showing the outer frame.

Fig. 7 is an enlarged fragmentary view illustrating the revolvable mounting of the window unit.

Referring now more particularly to the drawings in which I have shown the preferred embodiment of my invention, the letter T indicates a mobile home of conventional design. This is mounted on wheels 12 as usual for travel over the highways, and includes side walls 13—13, a rear wall 14, a roof 15 as usual.

The revolvable bay window combinations B to which the present invention is directed, are mounted in suitable cut-out openings 16, provided in the side walls 13—13, each window unit comprising, a window frame 17 in which glass panels 18 and 19 are set in the usual manner, the sections 18 being disposed angularly with relation to the section 19, and preferably flat metallic sections 20—20 form a closure for the top and bottom of the window structure.

A continuous wood strip 21 is secured to the side jambs of the window frame, and sections 22 also span the top and bottom thereof all clearly shown in Fig. 4 of the drawings. Preferably metal plates 23—23 are provided intermediate the length of the sections 20 at the top and bottom, and a spacer collar 24 is interposed between each pair of plates, with a pin 25 projecting through said plates and collars to revolvably mount said window units in the cut-out openings 16.

Inasmuch as these window units are quite long I provide support blocks 26 on the lower edge of the cut-out openings 16, these blocks serving to support the window unit and preventing sag or warping of the frames thereof.

With the window unit revolvably mounted in position as shown in Figs 1 and 3 of the drawings, the inner and outer frames 27 and 28 are applied, each frame covering the space between the window strips 21 and 22 and the marginal edges of the cut-out openings 16.

Referring now to the inner frame 27, which is preferably but not necessarily formed of wood, this includes spaced apart openings for the reception of bolts 29 provided with teenuts 30, and the inner face of said frame is formed with parallel grooves 31 in which resilient, yieldable sealing strips 32 are mounted for engagement with the strip 21 and the marginal edge of the cut-out window openings 16, the bolts 29 being accommodated in the space between the window frame and the openings 16.

The outer frame 28 is preferably formed of metal and is of the same size as frame 27, it has a plurality of openings 33 spaced to register with the bolts 29 and a strip of resilient, yieldable sealing material 34 spans the space between the walls 13—13 and the strip 21 to form a tight insect and weatherproof joint. The end of the bolts 29 are threaded as shown and nuts 35 are threaded thereon to permit the frames to be drawn tightly in position.

When the window units are in position as shown in solid lines in Fig. 2 of the drawings and it is desired to rotate same so that the windows project into the interior of the structure, it is merely necessary to unscrew the nuts 35, remove the frames 27 and 28, after which the window unit can be rotated 180 degrees so that the windows project into the interior of the home. The inner frame 27 is then placed in position so that the bolts 29 project beyond the side walls of the structure. The next step is to apply the outer frame 28, and with the bolts extending through the openings 33 in the frame the nuts 35 are threaded in position, and the entire assembly is complete, it is a very simple operation which can be very quickly and easily accomplished.

To return the windows to original position merely requires a repetition of the operation above described.

With the windows in outer extended position the interior of the structure is materially enlarged, giving additional living and storage space, enlarging the view of the occupants of the home, and providing weathertight and insect proof connection.

From the foregoing description it will be obvious that I have perfected a very simple, practical, sturdy, and economical bay window structure, by means of which the interior space of a mobile home can be substantially enlarged, and which is revolvably adjustable to project into the interior of the mobile home so that the home is then of regulation width to permit travel over the highways, or from one location to another.

What I claim is:

1. In a mobile home structure having a housing body wall formed with a window opening therein; the combination of a reversible bay window unit of a size substantially corresponding to but less than the size of said opening so as to be received in said opening and provide a marginal space between said unit and the edge of said opening; means pivotally mounting said bay window unit for swinging movements about a vertical axis; a window frame member at one side of said body wall spanning said space and extending beyond each side thereof to overlie said body wall and said bay window unit; removable fastening means supporting said window frame member on the body wall; a clamp member on the opposite side of said body wall supported by said fastening means in engagement with said body wall; said fastening means extending from said frame member through said marginal space between the bay window unit and body wall, and being operative to draw said clamp member, said window frame, said body wall, and said bay window unit into clamped relation.

2. The construction set forth in claim 1 including strips of material interposed between at least one side of said wall and said unit and the adjacent frame member to form a weather and insect seal.

3. The construction set forth in claim 1 including strips of material interposed between each side of said wall and unit and the associated frame member to form a weather and insect seal.

4. The construction set forth in claim 1 in which said fastening means comprises bolts having at least one threaded end extending through said frame member and clamp member and removably receiving a threaded nut at said one end.

5. The construction set forth in claim 1 including means interposed between the lower portion of said window unit and the corresponding edge of said opening at spaced intervals for aiding in the support of said window unit.

References Cited in the file of this patent

UNITED STATES PATENTS

| | | |
|---|---|---|
| 344,418 | Smith | June 29, 1886 |
| 568,041 | Quackenboss | Sept. 22, 1896 |
| 1,237,712 | Sisson | Aug. 21, 1917 |
| 2,506,870 | Hairston | May 9, 1950 |
| 2,587,547 | Steingruber | Feb. 26, 1952 |
| 2,758,344 | Williams | Aug. 14, 1956 |
| 2,820,991 | Poole | Jan. 28, 1958 |

FOREIGN PATENTS

| | | |
|---|---|---|
| 28,683 | Great Britain | Dec. 30, 1903 |
| 397,982 | Great Britain | Sept. 7, 1933 |